United States Patent [19]

Bohlmann

[11] 4,187,048

[45] Feb. 5, 1980

[54] LOADING AND UNLOADING APPARATUS FOR A VAN

[76] Inventor: Orville R. Bohlmann, Box 369, Denison, Iowa 51442

[21] Appl. No.: 880,193

[22] Filed: Feb. 22, 1978

[51] Int. Cl.² .............................................. B60P 1/00
[52] U.S. Cl. .................................... 414/542; 414/348
[58] Field of Search ................... 214/10, 13, 15, 75 H, 214/75 R; 414/348, 540–542

[56] References Cited

U.S. PATENT DOCUMENTS

| | | | |
|---|---|---|---|
| 2,289,366 | 7/1942 | Johnson | 214/75 H |
| 2,428,144 | 9/1947 | Clough | 214/75 H |
| 2,773,606 | 12/1956 | Shepherd | 214/75 H X |
| 2,778,512 | 1/1957 | Strona | 214/75 H |

FOREIGN PATENT DOCUMENTS

| | | | |
|---|---|---|---|
| 1078886 | 5/1954 | France | 214/75 H |
| 678269 | 9/1952 | United Kingdom | 214/75 H |

*Primary Examiner*—Stephen G. Kunin
*Assistant Examiner*—Terrance L. Siemens
*Attorney, Agent, or Firm*—Henderson & Sturm

[57] ABSTRACT

A loading and unloading apparatus for a van of a type including a framework within the van for slideably supporting a beam. A winch is moveably disposed on the beam for allowing an object to be loaded to be hoisted upwardly when the beam and hoist extend outside of the van; and, then the object can be moved into the van by movement of the beam into the van and movement of the winch and object along the beam in the same direction. Once the object is properly positioned within the van, it can be lowered to the floor of the van for support. Upon reaching the destination for the object, the winch is again used to raise the object off of the floor, whereupon the object is manually pushed out of the van causing movement of the beam and movement of the winch along the beam. Once the object is outside of the van, it can then be lowered to the ground by further use of the winch.

3 Claims, 6 Drawing Figures

LOADING AND UNLOADING APPARATUS FOR A VAN

BACKGROUND OF THE INVENTION

The present invention relates to an apparatus for loading and unloading heavy objects to and from a van and more particularly to such a device which facilitates easy installation to and removal from a van.

The use of vans for hauling heavy cargo has been limited to a large degree because of the difficulty of loading and unloading such cargo into a compartment which is completely covered. There are many commercial systems available for open trucks which have hoist systems mounted to the truck bed which are used for facilitating the loading and unloading of heavy cargo to and from such truck bed. This apparatus is normally very bulky and consumes a great deal of overhead space, but overhead space is not a problem with open trucks. It is, however, a very big problem when such structures are considered in conjunction for use with vans. One advantage is using a van instead of an open truck is the obvious one of sheltering such cargo from inclement weather conditions. Vans can also be used for many other purposes, such as for camping and the like unless the cargo space of the van is taken up by loading and unloading equipment.

Hoist systems, in general, normally require an extensive alteration to the vehicle and they are normally permanently attached thereto.

One example of a hoist system for a large truck is shown in U.S. Pat. No. 2,428,144, which shows a hoist connected to the top of a truck cargo enclosure structure. The problem with the prior art of this type is that it is not readily adaptable to vans because the top of a van would not be strong enough to withstand the forces to which it would be subjected in loading and unloading heavy objects.

SUMMARY OF THE INVENTION

The present invention relates to a loading and unloading apparatus for a van having a loading door opening. The loading and unloading apparatus includes a U-shaped framework disposed within the van adjacent to the loading door opening and a support post spaced from the U-shaped framework resting on the floor of the van and extending upwardly. An elongated support I-beam is slideably attached to a top portion of each of the U-shaped framework and the support post so that it is moveable from a first position whereby the beam extends out of the van loading door to a second position entirely within the van. Stop structures are provided for preventing the beam from moving beyond the first and second position but allowing the beam to move between the first and second positions. A winch is moveably attached to the I-beam so that it can be used to hoist up a heavy object outside of the van and with the object attached, be moved into the van along the I-beam, and moved with the I-beam. The winch can also be used to gently lower the object to be transported onto the floor of the van during transport; and, then, during unloading by hoisting the object up off of the floor, moving the hoist, beam and object towards the van loading door opening, and then for lowering the object to the ground once the object is suspended from the beam outside of the van.

An object of the present invention is to provide an improved loading and unloading apparatus for a van.

Another object of the present invention is to provide a loading and unloading system for a van which requires little or no alteration to the van.

A further object of the invention is to provide a loading and unloading apparatus for a van which takes up a minimum amount of space in the cargo area, such that the van can be used for other purposes while such hoist apparatus is disposed within the van.

Other objects, advantages, and novel features of the present invention will become apparent from the following detailed description of the invention when considered in conjunction with the accompanying drawings.

DESCRIPTION OF THE PREFERRED EMBODIMENT

Figure 1:
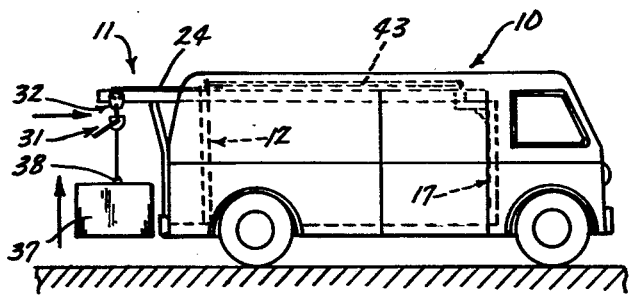
FIG. 1 shows a side elevational view of a van with the apparatus of the present invention disposed therein and showing the initial stages for use of such loading and unloading apparatus.
Figure 3:
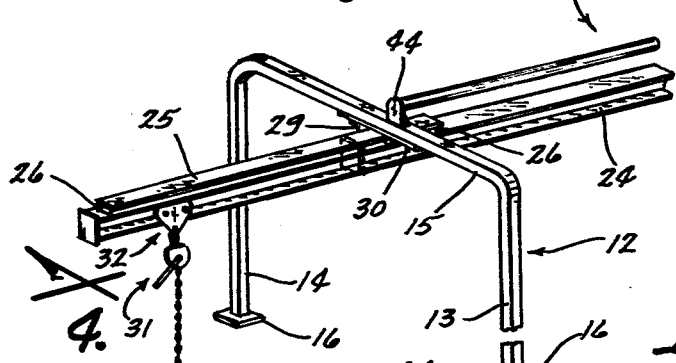
FIG. 3 is a perspective view of the loading and unloading apparatus of the present invention.

Referring now to the drawings wherein like reference numerals designate identical or corresponding parts throughout the several views, FIG. 1 shows a van 10 having the loading and unloading apparatus 11 of the present invention disposed therein. Referring to FIG. 3 it is noted that a U-shaped framework 12 is disposed at the rear of the van 10 and this U-shaped framework 12 has a first leg portion 13, a second leg portion 14, and a central portion 15. At the bottom of each of the leg members 13 and 14 are disposed plate members 16 which are normally welded to the bottom of legs 13 and 14 and which rest on the floor of the van 10. It is to be understood that these plates 16 can be bolted to the floor if desired.

Figure 6:
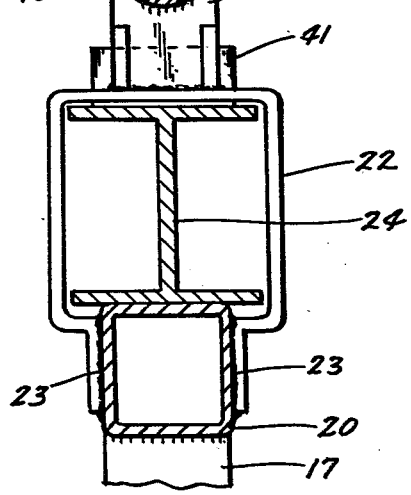
FIG. 6 is an enlarged cross-sectional view taken along line 6—6 of FIG. 4.

At the front of the van behind the front seat or seats thereof is disposed a support post 17 including a base member 18 and brace members 19. The support post 17 can be bolted to the floor by bolts extending through the base member 18, if desired. At the top of the post member 17 is a horizontally extending member 20. This horizontally extending member 20 is connected to the upstanding portion of the post 17, such as by welding, and an additional brace member 21 is provided by being welded to such horizontally extending member 20 and to the upstanding portion of the support post 17. On one end of the horizontally extending member 20 is disposed a sleeve member 22 which can be seen in greater detail in FIG. 6. This sleeve member 22 is connected to the horizontally extending portion 20 by welds 23, but it is to be understood that it could be connected in other known ways, such as by nut and bolt structures.

Figure 4:
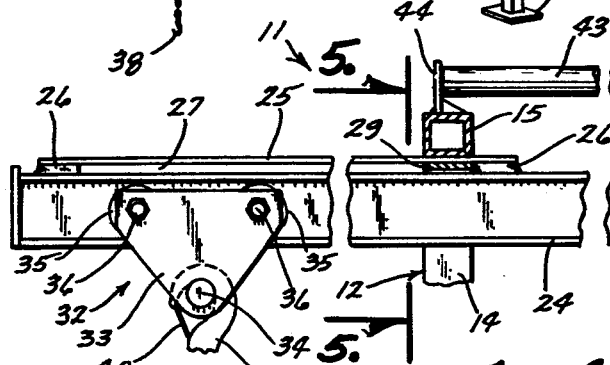
FIG. 4 is a cross-sectional view taken along line 4—4 of FIG. 3.
Figure 5:
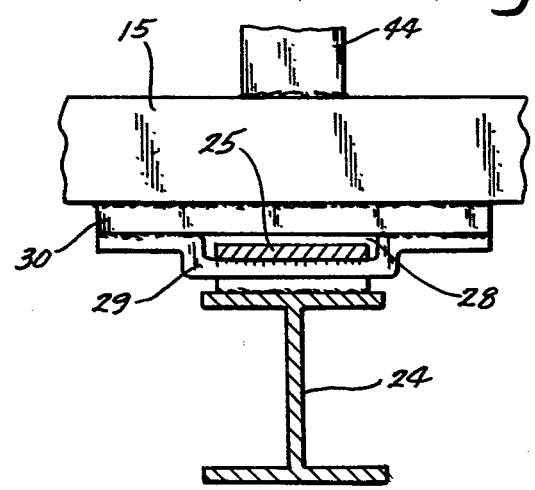
FIG. 5 is a cross-sectional view taken along line 5—5 of FIG. 4.

An I-beam member 24 is slideably disposed within the sleeve 22 and is slideable on top of the top surface of the horizontally extending member 20 and is supported thereby. Another portion of the I-beam 24 is slideably connected to the U-shaped framework 12 in the center of the central portion 15. Referring in particular to FIGS. 4 and 5 it is noted that a member 25 is connected to the beam 24 by means of spacer blocks 26 which are welded to the top of the beam 24 and to each member 25 so as to provide a space 27 between the member 25 and the top of the I-beam 24. This strut member 25 extends through an opening 28 disposed in the member 29. This member 29 is attached to the U-shaped framework 12 in the center of the central portion 15 thereof, such as by welding a member 30 to the central portion 15 and to the member 29 as is shown in FIG. 5. A hand operated winch 31 is moveably attached to the beam by a roller structure 32 including a pair of plates 33 disposed on each side of the I-beam 24 being secured together at the bottom by means of a pin 34. At the top of each of the plates 33 is mounted a pair of rollers 35 by means of a bearing structure (not shown) and a nut and bolt structure 36. This mounting structure 32 allows the winch to be rolled along the beam 24 so that the rollers 35 rest upon the lower extremity of the I-beam 24.

A brace 43 is connected at one end to the central portion 15 of the U-shaped framework 12 by means of a bracket 44 and at the other end to the top of the sleeve 22 by means of another bracket 45.

The brace 43, in combination with the U-shaped member 12 and the post structure 17 also serves as a roll bar in case the van should roll over, to add rigidity and prevent the roof of the van from being pushed in. The post structure 17-19, especially if bolted down, is also a safety feature, since it prevents the load from shifting forward into the driver and passenger area during sudden stops.

In operation, the van 10 would be backed up to an object 37 to be loaded. The rear doors of the van would be opened and the I-beam 24 would be slid outwardly from the position shown in FIG. 2 to the position shown in FIGS. 1 and 3. Once this has been accomplished and the winch 31 is properly positioned over the object 37, the hook portion 38 of the winch 31 would be attached to the object 37 and then the winch 31 would be used to raise the object 37 upwardly as shown in FIG. 1, up to a level above the floor of the van 10. Once the object has been so elevated, the load would be rolled inwardly on the beam 24 as far as is possible on rollers 35. The winch 31 would then be operated to lower the load onto the floor at which time the beam 24 would be slid inwardly from the position shown in FIGS. 1 and 3 to the position shown in FIG. 2. It is to be understood, of course, that more than one object can be loaded into the van using this procedure and whereas the beam 24 only needs to be pushed back into the van 10 after all of such objects have been loaded.

Figure 2:
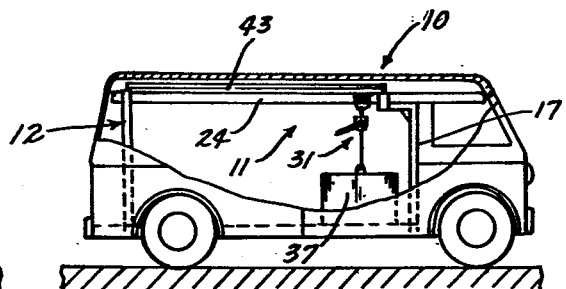
FIG. 2 is a partial cross-sectional view and partial side elevational view of the van as shown in FIG. 1, but showing the cargo in a loaded position.

When it is desired to unload one or more of the objects from van 10, a reverse procedure is used. That is, the I-beam 24 is slid outwardly of the van 10 from the position shown in FIG. 2 to the position shown in FIGS. 1 and 3, the winch 31 is utilized inside of the van as shown in FIG. 2 to lift the object 37 off of the floor of the van 10, and the load and winch are then manually pushed rearwardly out of such van 10 to the position shown in FIG. 1. That is, the winch 31 and load 37 are moved by rolling the rollers 35 on the I-beam 24 to the position shown in FIG. 1. Once the load is moved to the position shown in FIG. 1, the winch 31 is then operated in a conventional manner to lower the object 37 to the ground or to whatever unloading platform is provided.

It is also noted that stop structures 41 and 42 as shown in FIGS. 3 and 4 are provided for limiting the movements of the beam 24 between the extreme positions shown in FIGS. 1 and 2. These stops 41 and 42 are preferably welded to the top of the beam 24, but they could, of course, be attached in other ways. The members 26 which hold the strut member 25 in place can also be used as stop members if desired.

Accordingly, it can be seen that this preferred embodiment of the invention does indeed accomplish the objects mentioned above. Obviously, many modifications and variations of the present invention are possible in light of the above teachings. It is therefore to be understood that, within the scope of the appended claims, the invention may be practiced otherwise than as specifically described.

I claim:

1. An apparatus for loading and unloading heavy objects to and from a van having a loading door opening therein, comprising:
   a U-shaped framework having a central portion, a first leg portion connected to one end of the central portion and extending to the floor of the van and a second leg portion connected to the other end of said central portion and extending to the floor of the van, said U-shaped framework being positioned adjacent to said van loading door opening whereby said legs are positioned on each side of said van loading door opening;
   a support post in abutment with the floor of the van at the bottom thereof and extending upwardly;
   an elongated beam being I-shaped in cross-section;
   means for slideably attaching said beam to a top portion of said support post including a sleeve means for receiving said beam and allowing the beam to slide within said sleeve means;
   support means connected to the top of said sleeve means and to the top of the central portion of the U-shaped member for stabilizing said apparatus.
   means for slideably attaching said beam to the central portion of said U-shaped member;
   winch means connected to said beam for selectively raising heavy objects towards said beam and lowering said heavy objects away from said beam, including means for attaching an object to be lifted to said winch means;
   roller means for attaching said winch means to said beam for allowing said winch to be moveable along said beam; and
   stop means connected to said beam for allowing movement of said beam with respect to said framework between a first position whereby said beam extends out of said van loading door opening to a second position whereby said beam is located entirely within said van.

2. An apparatus for loading and unloading heavy objects to and from a van having a loading door opening therein, comprising:
   a U-shaped framework having a central portion, a first leg portion connected to one end of the central portion and extending to the floor of the van and a second leg portion connected to the other end of said central portion and extending to the floor of the van, said U-shaped framework being positioned adjacent to said van loading door opening whereby said legs are positioned on each side of said van loading door opening;

a support post in abutment with the floor of the van at the bottom thereof and extending upwardly;

an elongated beam being I-shaped in cross-section;

means for slideably attaching said beam to a top portion of said support post including a sleeve means for receiving said beam and allowing the beam to slide within said sleeve means;

means for slideably attaching said beam to the central portion of said U-shaped member;

winch means connected to said beam for selectively raising heavy objects towards said beam and lowering said heavy objects away from said beam, including means for attaching an object to be lifted to said winch means;

roller means for attaching said winch means to said beam for allowing said winch to be moveable along said beam;

stop means connected to said beam for allowing movement of said beam with respect to said framework between a first position whereby said beam extends out of said van loading door opening to a second position whereby said beam is located entirely within said van; and said support post including a horizontally extending portion and said sleeve means is connected to said horizontally extending portion whereby said beam slides upon and is supported by an upper surface of said horizontally extending portion.

3. An apparatus for loading and unloading heavy objects to and from a van having a loading door opening therein, comprising:

a U-shaped framework having a central portion, a first leg portion connected to one end of the central portion and extending to the floor of the van and a second leg portion connected to the other end of said central portion and extending to the floor of the van, said U-shaped framework being positioned adjacent to said van loading door opening whereby said legs are positioned on each side of said van loading door opening;

a support post in abutment with the floor of the van at the bottom thereof and extending upwardly;

an elongated beam being I-shaped in cross-section;

means for slideably attaching said beam to a top portion of said support post including a sleeve means for receiving said beam and allowing the beam to slide within said sleeve means;

means for slideably attaching said beam to the central portion of said U-shaped member;

winch means connected to said beam for selectively raising heavy objects towards said beam and lowering said heavy objects away from said beam, including means for attaching an object to be lifted to said winch means;

roller means for attaching said winch means to said beam for allowing said winch to be moveable along said beam;

stop means connected to said beam for allowing movement of said beam with respect to said framework between a first position whereby said beam extends out of said van loading door opening to a second position whereby said beam is located entirely within said van; and said U-shaped member including a strut member connected to the top of said beam at the ends of said strut member and having a space between a central portion of said strut member and said beam, a supporting member connected to said U-shaped framework and extending between said strut member and the top of said beam.

* * * * *